United States Patent [19]

Gerber et al.

[11] Patent Number: 5,657,383

[45] Date of Patent: Aug. 12, 1997

[54] FLEXIBLE CUSTOMER CONTROLLED TELECOMMUNICATIONS HANDLING

[75] Inventors: Eugene Gerber, Bolingbrook; Mary Rita Otto, Lisle; Wayne Alan Senneke, Aurora, all of Ill.

[73] Assignee: Lucent Technologies Inc., Murray Hill, N.J.

[21] Appl. No.: 470,238

[22] Filed: Jun. 6, 1995

[51] Int. Cl.$^6$ .................................................. H04M 3/00
[52] U.S. Cl. ............................ 379/266; 379/265; 379/207
[58] Field of Search ................................ 379/207, 211, 379/212, 220, 221, 229, 231, 234, 265, 266

[56] References Cited

U.S. PATENT DOCUMENTS

| | | | |
|---|---|---|---|
| 5,036,535 | 7/1991 | Gechter et al. | 379/210 |
| 5,062,103 | 10/1991 | Davidson et al. | 370/58.1 |
| 5,155,761 | 10/1992 | Hammond | 379/142 |
| 5,185,782 | 2/1993 | Srinivasan | 379/67 |
| 5,247,571 | 9/1993 | Kay et al. | 379/212 |
| 5,253,288 | 10/1993 | Frey et al. | 379/221 |
| 5,255,305 | 10/1993 | Sattar | 379/201 |
| 5,291,552 | 3/1994 | Kerrigan et al. | 379/266 |
| 5,299,259 | 3/1994 | Otto | 379/221 |
| 5,311,572 | 5/1994 | Friedes et al. | 379/230 |
| 5,311,574 | 5/1994 | Livanos | 379/67 |
| 5,335,268 | 8/1994 | Kelly, Jr. et al. | 379/221 |
| 5,422,941 | 6/1995 | Hasenauer et al. | 379/207 |
| 5,436,966 | 7/1995 | Barrett et al. | 379/207 |
| 5,452,350 | 9/1995 | Reynolds et al. | 379/220 |
| 5,479,487 | 12/1995 | Hammond | 379/210 |
| 5,497,373 | 3/1996 | Hulen et al. | 379/89 |

OTHER PUBLICATIONS

AT&T Brochure 475–550–120, Pinnacle(R) Automatic Call Distributor, Call Vectoring Guide, 5E6 to 5E9 Software Releases, Issue 2.00, Nov. 1993, pp. 1–1—6–3.

*Primary Examiner*—Krista M. Zele
*Assistant Examiner*—Daniel S. Hunter

[57] ABSTRACT

A central office controlled private branch exchange (PBX) is enhanced to provide more flexible services through the addition of new call vectors for controlling call processing. These new call vectors can access stored customer data to customize the treatment of incoming calls to meet the demands of individual customers. Advantageously, a broad class of new services for such systems is made available through the use of such new call vectors.

2 Claims, 8 Drawing Sheets

```
COMMENT
DELAY WITH MUSIC
DELAY WITH RING
DELAY WITH SILENCE
ENTER QUEUE
FORCE BUSY
FORCE DISCONNECT
GO TO STEP
IF AVAILABLE AGENTS <=
IF AVAILABLE AGENTS >
IF CALLS IN QUEUE <=
IF CALLS IN QUEUE >
IF DAY OF WEEK ==
IF DAY OF WEEK <=
IF DAY OF WEEK >
IF DAY OF WEEK BETWEEN
IF DAY OF WEEK OUTSIDE
IF DIGIT NUMBER ==
IF DIGIT NUMBER <=
IF DIGIT NUMBER >
IF EXPECTED DELAY <=
IF EXPECTED DELAY >
IF LOGGED IN AGENTS <=
IF LOGGED IN AGENTS >
IF TIME OF DAY <=
IF TIME OF DAY >
IF TIME OF DAY BETWEEN
IF TIME OF DAY OUTSIDE
IF WAIT TIME <=
IF WAIT TIME >
LABEL
PLAY ANNOUNCEMENT
PROMPT FOR DIGITS
RETURN ANSWER SUPERVISION
ROUTE TO DESTINATION
STOP
```

(PRIOR ART)

*FIG. 2*

FLEXIBLE CUSTOMER CONTROLLED TELECOMMUNICATIONS HANDLING

TECHNICAL FIELD

This invention relates to the provision of custom services to telecommunications customers.

1. Problem

Telecommunication systems such as telephone systems have become increasingly sophisticated and are providing a broader and broader range of services. Most of these services are provided singly with relatively little interaction. For example, a typical customer service package might include capabilities for abbreviated dialing, call forwarding, add on call service, and voice mail. Usually, these services are utilized one at a time and are generally under the control of the called customer. AT&T's DEFINITY® system has partially solved some of these problems through the provision of a feature called "call vectors." Call vectors are a flexible programming language for specifying conditions and reaction to conditions that are encountered in processing telephone calls. Call vectors are described in PINNACLE® Automatic Call Distributor, Call Vectoring Guide, Publication AT&T 475-550-120, Issue 2.00, November 1993, published by AT&T Corp. However, the call vectoring language lacks the facilities required for greater generality. In present telecommunications systems, especially telephone systems, there is no economical way of providing pre-planned, highly flexible call control where the service is planned by the called customer and its invocation is largely under the control of the calling customer.

2. Solution

The above problem is solved and an advance is made over the prior art in accordance with our invention wherein a called customer pre-specifies the treatment of incoming calls. In accordance with one aspect of the invention, the treatment is partly under the control of the caller who is invited to specify one of a plurality of treatments, for example, voice mail, automatic call back, or transfer to a specifiable alternate telephone, by voice command or keyed signals. In accordance with another aspect of the invention, the pre-specified treatment is time sensitive so that a different menu is prescribed for certain days of the week and/or times of the day. The prespecified treatment can also be made special for a specific set of caller(s). In accordance with another aspect of the invention, the caller may be prompted for data, either passive (account number, tally count number) or active (one or more digits for directing the call to one or more alternate destinations) for routing a call to one of a plurality of destinations. In accordance with one aspect of the invention, the switching system queries a customer premises computer to obtain data for modifying the processing of the call. Such modifying includes announcement, treatment (busy, auto complete to operators, retrieval and text-to-speech conversion of caller specific information, caller sensitive routing, and agent selection. As one example, certain callers could always be routed to the collection agents.

The call vectoring language lacks facilities for interacting with a host processor controlled by a customer. In accordance with applicants' invention, the call vectoring language is enhanced to include facilities for requesting a route from the host, requesting the caller to provide a code selectively accessing information from a base computer or transferring to a predefined vector step if the entered code is equal to a prespecified number, playing the text of information supplied by the host as an audio message to the caller, requesting a message from the host, wherein the host has previously received the caller identification, sending a message to the host (such as the caller identification), and requesting a prespecified date (a specialized case of a variable) from the host. Checks of current values of a variable (less than) or (greater or equal to) can be made against a stored variable in order to change mode of operation. Advantageously, these additional call vector functions permit an ACD switch to communicate with a host in order to help control the automatic operations performed by the ACD. This can be used to implement flexible voice mail and voice mail access, allow for the customer to enter an alternate telephone number for completion of calls directed to a primary telephone number when the primary telephone number is busy or is unattended, and allows for the implementation of automatic callback to customers whose calls have not been answered. In accordance with one aspect of the invention, customers may disconnect, but are called back as soon as their entry in the queue reaches the top.

In accordance with the principles of our invention, each customer having customized incoming service is provided with a table of call vectors. Each such call vector is for invoking execution of a call processing program for implementing all or part of the feature, depending on conditions at the time the call vector is invoked. The call vectors include tests of day and time, the calling telephone number, data supplied, for example, by keeping in this data, by the caller, which may be directly or indirectly used for selecting a particular call treatment or a particular alternate destination telephone, the calling and called numbers, the class of service of the called number, and current traffic and availability conditions, stored variable values and accessed values from adjunct equipment such as a host computer.

BRIEF DESCRIPTION OF THE DRAWING

FIG. 2 is a table of prior art call vectors;

DETAILED DESCRIPTION

Figure 1:
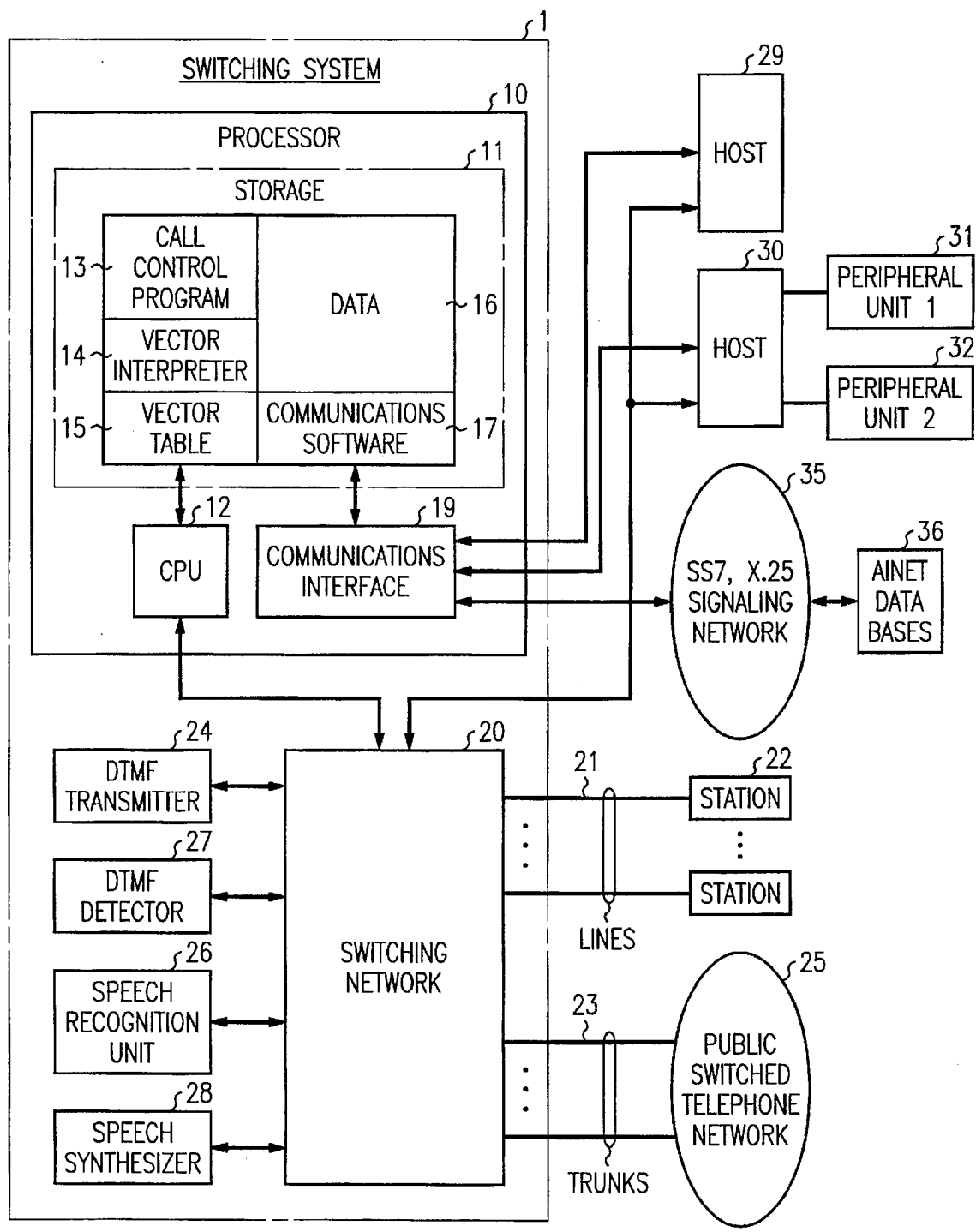
FIG. 1 is a block diagram of a switching system connected to the public switch telephone network for controlling agent stations of automatic call distributors.

FIG. 1 is a block diagram illustrating the operation of applicants' invention. Switching system 1 is connected by a plurality of trunks 23 to the public switched telephone network 25, from which all telephones of the public network can be accessed. Switch 1 is also connected to lines 21, terminating on stations 22, served by the switching system. These stations can be connected to each other through switching system 1, or can be connected to caller or called parties through the public switched telephone network. The particular application for applicants' invention is an ACD) system, such as AT&T's PINNACLE® ACD driven from a Centrex system such as AT&T's 5ESS® switching system, both manufactured by AT&T Network Systems. A Centrex is an arrangement for a business which allows individual stations to be accessed using a telephone number which also usually functions as an automatic call distributor to distribute calls from some main number (as to a member of one or more teams of agents). The object of applicants' invention is to create a still more flexible Centrex system through the provision and use of an enhanced call vectoring system.

Switching system 1 includes a processor 10, having storage 11 and a central processing unit 12, and a communications interface 19. Storage includes call control program 13, a program for interpreting call vectors 14, a table of call vectors 15 for the various customers served by switching system 1, data 16, including both office data, describing the customers of the switching system, and keeping track of calls in progress, and communications software 17 for communicating with communications interface 19. The communications interface interfaces with a signaling network 35 for carrying signaling system 7 and X.25 data packets, and for communicating with the advanced intelligent network (AINET) databases of the public switched telephone network. Communication interface also interfaces with host computers 29 and 30. Host computer 30 is shown with two peripheral units 31 and 32. The host computer interfaces with block 19 using LAN data protocol such as TCP/IP. A server network connected to host computers, peripherals, or other sewers, can further expand the capabilities of this interface. The host computers are administered by individual customers and contain data and control indications supplies by these customers (This is in contrast to the information stored in the processor storage 11, which is under the control of, and/or supplied by the telephone administration, except for vector table 15, which is under the control of the customer.)

The processor receives signals from and controls switching network 20, which is connected to dual tone multifrequency transmitters 24, speech recognition units 26, dual tone multifrequency detectors 27, and speech synthesizing units 28.

The DTMF transmitter can be used for transmitting DTMF tones to hosts equipped for receiving such tones. Such tones may represent a message and are an alternate method of transmitting data to a host such as host 30. The host would be equipped with DTMF transmitters to transmit data back to the switching system to provide data or to set up a connection.

FIG. 2 illustrates the call vector steps available in the prior art. The comment step is strictly for documentation. The three delay steps provide a situation in which the caller is connected to music, ringing, or silence, either for a predefined time, or until the event indicated by the next step occurs, whichever occurs first. Enter queue places the call in the specified queue. Force busy returns a busy signal to the caller. Force disconnect disconnects the caller. The go to step transfers control to the specified call vector step. If available agents are equal or less than, or are greater than, the specified number of agents, execute the associated step. The same applies to calls in queue, day of week, digit number, expected delay, logged in agents, time of day, and wait time. The label step identifies a call vector table position so that the call vectors starting from that position may be executed upon request from another step (such as a go to). Play announcement selects a prerecorded announcement specified in the call vectoring step. Prompt for digits requests the customer to enter digits for use by the switch in routing the call. Return answer supervision returns the answer supervision to the caller. Route to destination routes the call to the destination specified, by specifying a route index which is used by the call control program in the conventional way. The stop command is inserted wherever a transfer is not legal so that the system stops when it encounters this step; when this happens, the condition is recorded for future use in program debugging and the call vector program returns to default treatment, and exits vector control.

The prompt step causes the quoted announcement to be provided to the caller. The two "if" statements indicate the actions to be performed based on the number received from the caller. If the caller keys 2, then the call is to be transferred to "voice mail," a destination previously defined in the call vector program. If the digit is 3, then the call is to be routed to extension 1234 (the extension of the switchboard). Finally, if the customer has keyed 1, or has not keyed anything, then the call enters queue 1 to queue for the next available agent.

The following call vector program illustrates the operation of the call vectoring language:

Prompt: "Please press 1 to remain in queue for next available agents, press 2 to leave a message, press 3 to transfer to the switchboard, or stay on the line for an agent."

If digit=2, Route to "voice mail"
If digit=3, Route to 1234
In all other cases enter queue 1

The following is a description of the new call vector steps for enhanced call vectoring being introduced to implement applicants' invention:

PROMPT with announcement Announcement_Name for N digits and SET Integer_Variable_Name to the VALUE (collected_digits_string)

Description: This step will play an announcement such as "Enter the status value." The caller will then input (as DTMF or some other method) digits which represent the desired value. The step then converts the collected digits to an integer value; i.e., the consecutive DTMF tones for 1-2-3 would be converted to the binary equivalent of the decimal value 123. The resulting value would then be stored into the designated variable name as an integer value.

PROMPT with announcement Announcement_Name for N digits and SET String_Pointer_Name to the collected_digits_string Description: This step will play an announcement such as "Enter the status value." The caller will then input (as DTMF or some other method) digits which represent the desired string of information. The step then marks the end of the string with a defined delimiter for end-of-string. The String_Pointer_Name is then assigned the address of the first byte of the string within the allocated string storage buffer. This allows the String_Pointer_Name to reference this string for various purposes.

PROMPT with announcement Announcement_Name for N digits and ROUTE TO EXTENSION collected_digits_string Description: This step will play an announcement such as "Enter the extension to which you wish to be connected." The caller will then input (as DTMF or some other method) digits which represent the desired extension number. The step then converts the collected digits into a format usable for referencing an extension and routes the call to that extension. All routing restriction features can be applied during the route step, and any and all treatments for a call placed directly to an extension can be invoked for this call.

PROBE device Device_ID with request Request_Script_Entry for variable Integer_Variable_Name Description: This step will send a request sequence (defined as a particular script necessary to access the information) to the designated device. For example, this "probe" could be reading a particular location in memory on a hard disk, or it could be reading a comm port. The type of information sought is defined by the definition of the variable selected for the storage of the information obtained; "Integer_Variable_Name" in this case.

PROBE-STRING device Device_ID with request Request_Script_Entry for variable String_Pointer_Name, String_Pointer_Length Description: This step will send a request sequence (defined as a particular script necessary to access the information) to the designated device. For example, this "probe" could be reading a particular location in memory on a hard disk, or it could be reading a comm port. The type of information sought is a string of information of a specified maximum length, which may or may not contain the defined string delimiter. The PROBE will collect up to the specified number of bytes until the defined string delimiter is encountered, in which case it will stop collection before reaching the specified maximum number of bytes. The data will be stored in an allocated string buffer, and the string will be appended with the defined string delimiter character. The address of the first byte of the stored string will be loaded into the variable String_Pointer_Length.

REQUEST-ROUTE from device Device_ID
Description: This step will send an event message over a predefined interface to the designated host. The event message will contain the call_id of the call being processed at that time, and an agreed upon information element designated for requesting routing information from the device. A timer will start, and the vector will wait until that timer expires for the defined ROUTE-REQUEST-RESPONSE event message from the designated device. In the event that the message is not received before the timer expires, error treatment can be specified.

NOTE: Error treatment for each of these vector steps can be specified.

CONVERT-AND-ANNOUNCE text String_Pointer_Name CONVERT-AND-ANNOUNCE text "actual_text_string"
Description: This step will perform text to speech conversion of the designated data string (hopefully, a comprehensible text), and play the resulting audio signal to the caller.

PROMPT with announcement Announcement_Name, COLLECT-AND-DECODE caller speech for a maximum of X seconds, and save in variable String_Pointer_Name
Description: This step will collect and process the spoken input of the caller No. This needs to be an interactive process with shared control. Or maybe it doesn't. Maybe I should talk to Sam about this.

NOTIFY device Device_ID using script Notification_Script_Pointer, variable Variable Name
Description: This step will cause a message to be sent to a device using a selected message format (specified by the script stored at Notification Script Pointer). The message will transmit the value of the designated variable.

For example, a call is placed to Ticketmaster, which is currently serving many other calls. Therefore, there is a long wait. The switch plays an announcement, "We are experiencing delays. You may enter your telephone number and we will call you back to take your order. You may then hang up and your call will be returned in the order received." The caller enters his/her number and is then instructed to hang up. The caller's identification remains in queue, but uses no voice channel resources. When that caller's identification is ready for delivery to an agent, the switch automatically places a call from the serving agent to the recorded phone number. If that number is busy, the identification is returned to the queue to be tried again later.

IF RESPONSE==(speech recognition)
IF RESPONSE=/=(speech recognition)
Description: Speech recognition converts a spoken word or phrase to text; if the text matches or does not match the word or phrase specified, execute the command specified in the call vector; otherwise, continue to the next call vector statement.

IF TEXT==
IF TEXT=/=
Description: Caller keys in a number and/or function; if the keyed in number or function matches or does not match the specified text, execute the command specified in the call vector; otherwise, continue to the next call vector statement.

Figure 3:
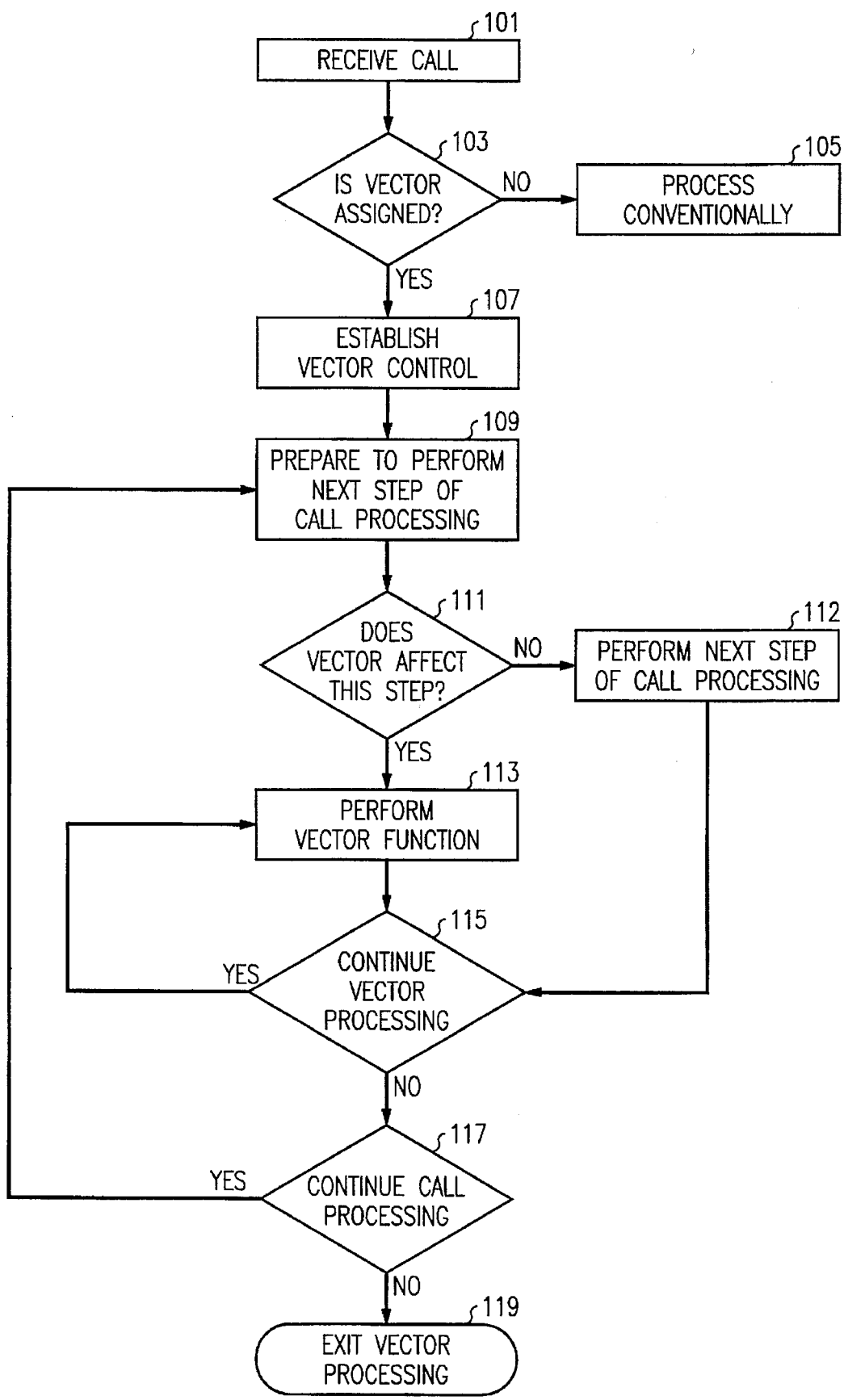
FIG. 3 is a flow diagram illustrating the operation of call vector control.

FIG. 3 illustrates the basic steps of performing call processing under vector control. When a call is received (action block 101), translation for the terminating number is made and test 103 is used to determine whether a call vector program is assigned for processing calls to the terminating number. If not, the call is processed conventionally (action block 105). If so, the vector control arrangement is established within call processing to control the execution of different call processing sequences (action block 107). The vector control arrangement keeps track of where in the table of vectors for the terminating number the call processing program for this call has progressed to. Block 109 is a first block in a call processing loop and indicates that the next step of call processing is to be performed. Test 111 determines whether a call vector affects this step; if not, action block 112 performs the next step of the call processing without consulting the vector. If so, then the vector controlled function is performed (action block 113). Following performance of either block 112 or 113, test 115 determines if more vector processing is needed. If so, action block 113 is re-entered. If not, test 117 determines whether more call processing is needed within this program. If so, then action block 109 is re-entered. If not, vector processing for this call is exited (block 119), and default call processing or normal call processing continues.

Figure 4:
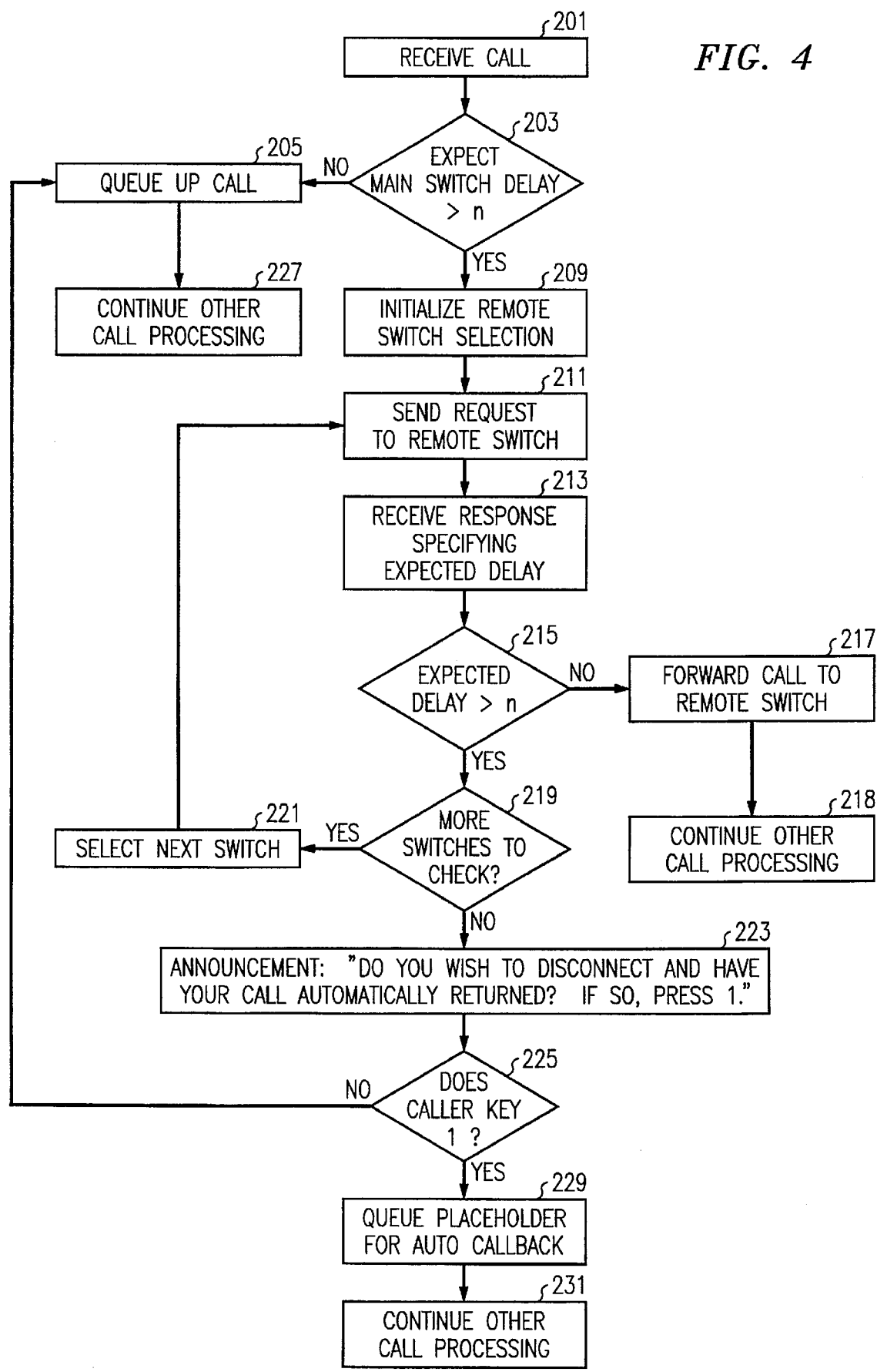
FIGS. 4, 5, and 6A–6C are flow diagrams illustrating various call scenarios.

FIG. 4 is one example of the use of the call vectoring in accordance with the principles of this invention, which is implemented in a stored program controlled automatic call distributor (ACD) feature of a central office switch or a private branch exchange (PBX) switch. While the preferred embodiment described herein is for a central office switch, the call vector control arrangement can also be used in a PBX. The program of FIG. 4 is used to determine whether a call should be served locally or from a remote switch of the called ACD, and to allow for automatic call back if the caller so requests. A call is received (action block 201) and the expected delay is tested to see if it exceeds a parameter specified in the call vector consulted for test 203 (for example, this step would be specified by the "If Expected Delay>" call vector step). If the expected delay is not exceeded, then the call is queued (action block 205), and other call processing is continued (action block 227); thereafter the call will be treated conventionally. If the expected delay is greater than that specified in the call vector (and this specified delay can be varied according to the time of day and day of week), then the first remote switch to be tested also specified by a call vector has its identity placed in the remote switch selection block of the call processing control for this call (action block 209). A request is then sent to the remote switch (action block 211) which returns a message specifying the expected delay (action block 213). Steps 211 and 213 are accomplished using the "Probe Device" command, specifically a remote switch. The Request Script_Entry command is used to obtain the delay status for the remote switch. Test 215 is used to determine whether the reported delay is excessive. This delay may be fixed for all switches tested in this program, or may be different for each switch as determined by the call vector parameters for the terminating number of this call. If the reported delay is not excessive, then the call is forwarded to the remote switch (action block 217) for subsequent processing by that switch and normal call processing is continued (action block 218). If the expected delay, the reported delay, then test 219 is used to determine if there are any more alternate remote switches to be checked. If so, then the next switch of the switches to be tested as specified by the call vectors is selected (action block 221) and action block 211 is re-entered in order to send the request to the selected remote switch. If not, then an announcement is sent to the customer and "do you wish to disconnect and have your call automatically returned?"; "if so, press 1" (action block 223). Test 225 is used to determine whether the customer has keyed in digit 1. If not, then the call is simply queued up (action block 205, previously discussed), and other call processing is continued (action block 227). If the caller does press 1, then instead of placing the call in the queue, a place holder is placed in the queue for automatic callback (action block 229). When the place holder is reached in the course of serving the queue, the customer is called back and some kind of signal is provided to the agent, identifying the caller's directory number and indicating that this is a callback interaction and not an original call interaction. The place holder, of course, must include data for identifying the caller's telephone number. After the place holder has been inserted in the queue, other call processing can continue (action block 231).

Figure 5:
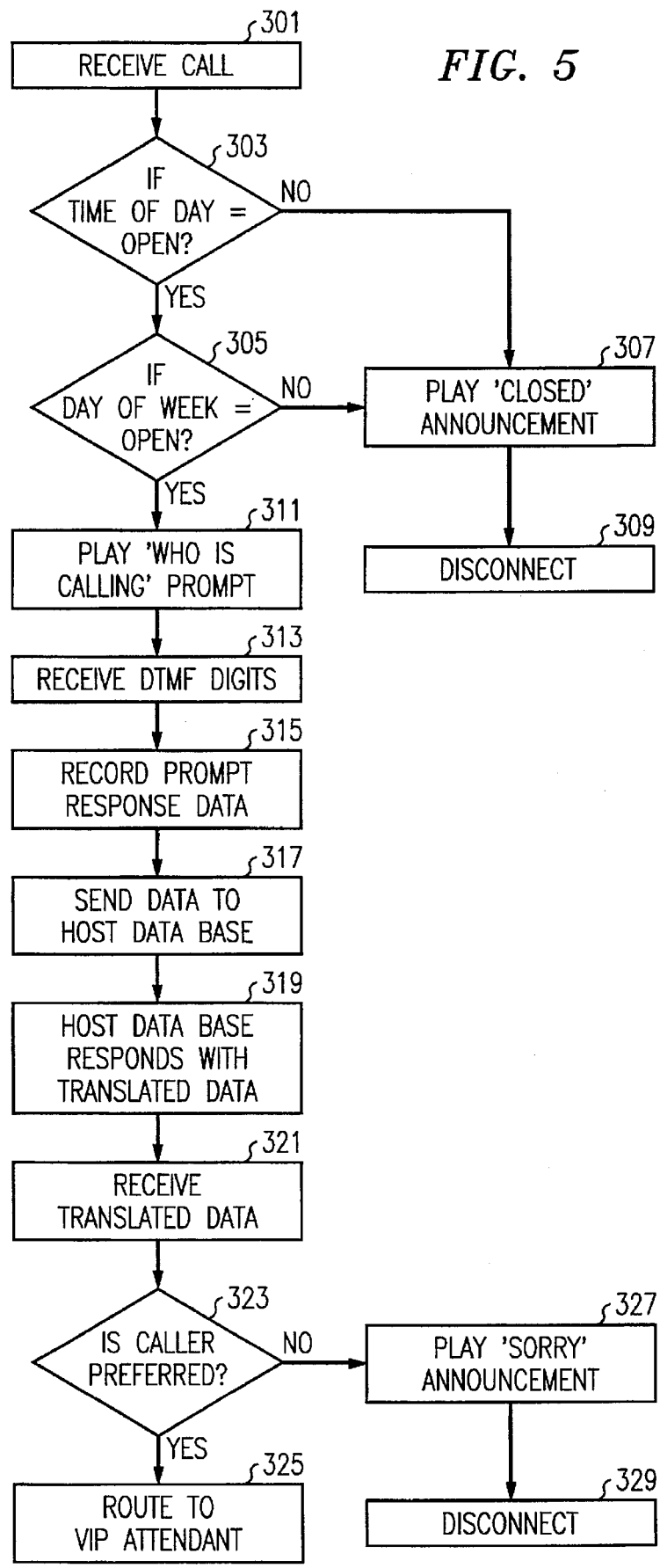

FIG. 5 is a flow diagram of callers to a VIP (very important person) number. The objective is to prevent unauthorized use of this number. Action block 301 shows that the call has been received. Test 303 is used to determine if the time of day is within the open hours of the office. If so, test 305 is used to determine whether the office is open on this day of the week. If either test 303 or test 305 fails, then action block 309 is entered and an announcement is played indicating that the office is closed. The customer is then disconnected (action block 307). Note that the time of day, day of week, and identification of the customer, as well as the sequence, are all specified by vectors and the parameters in these vectors.

If test 303 and 305 pass, then an announcement is played requesting that the caller identify him or herself (action block 311). Action blocks 311-315 are initiated using the commands: Prompt with announcement "Who is calling?" for N digits, and prepared "ID Number" to the Value (collected digit siring) (action block 313). Action block 317 is implemented using the Request-Remote component from the device host (action block 315). The caller keys in dual-tone multi-frequency (DTMF) digits, which are received (action block 313). These digits may represent personal identification numbers or other private information for identifying the caller. Action block 315 records the data received in response to the "who is calling" request and this data is sent to the host data base (action block 317). The host database responds with translated data (action block 319) and the switch receives this translated data (action block 321). Test 323 is then used to determine if the caller is a preferred caller. If so, then the call is routed to a VIP attendant (action block 325). The actions of block 323-329 are implemented via the response returned from the host, which is either the extension number of an agent or a routing index to route the caller to announcement and/or disconnect. If not, then the call is routed to an announcement indicating a polite refusal (action block 327) and the caller is disconnected (action block 329). The actions of block 323-329 are implemented via the response returned from the host, which is either the extension number of an agent or a routing index to route the caller to announcement and/or disconnect.

Figure 6A:
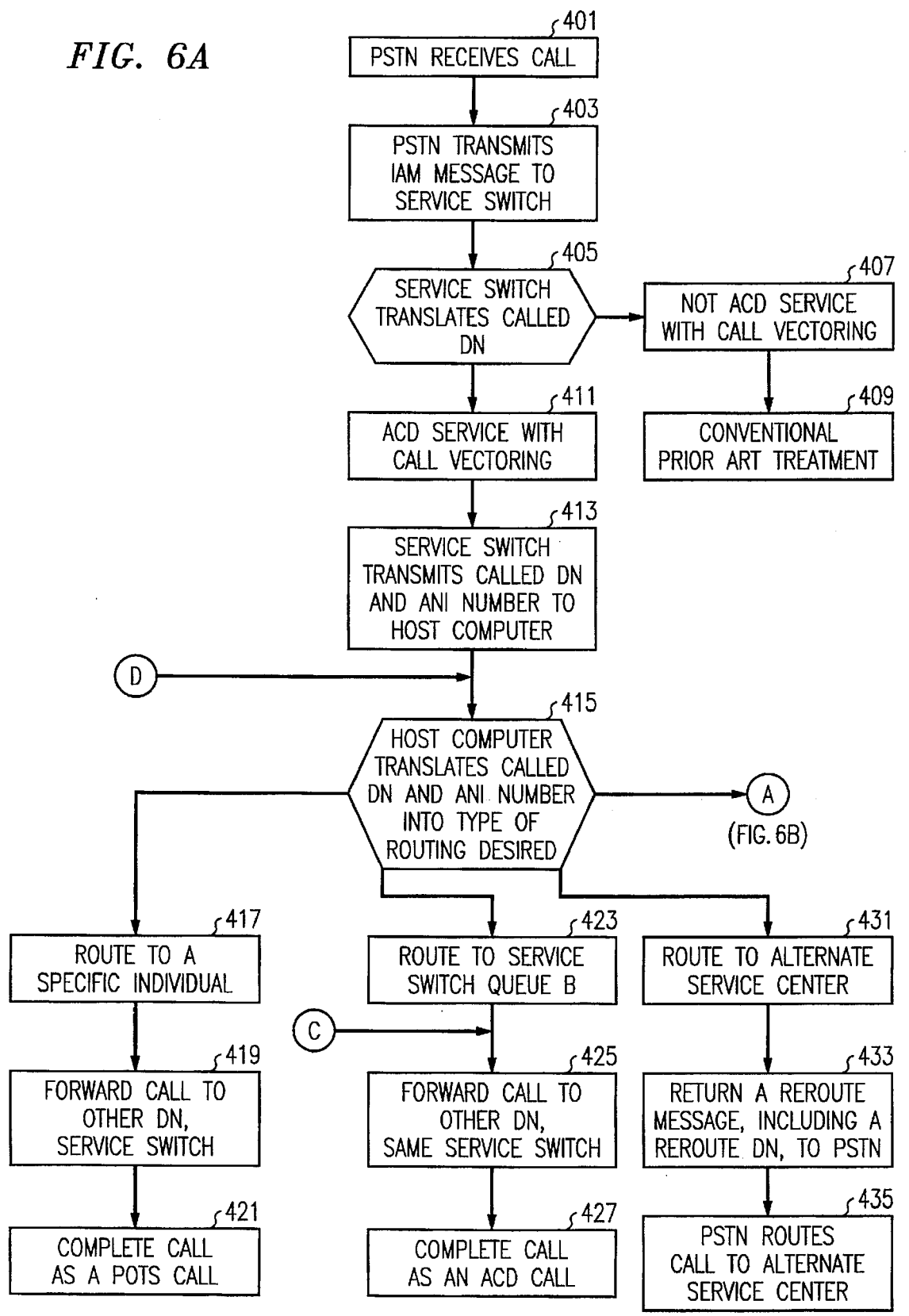
Figure 6B:
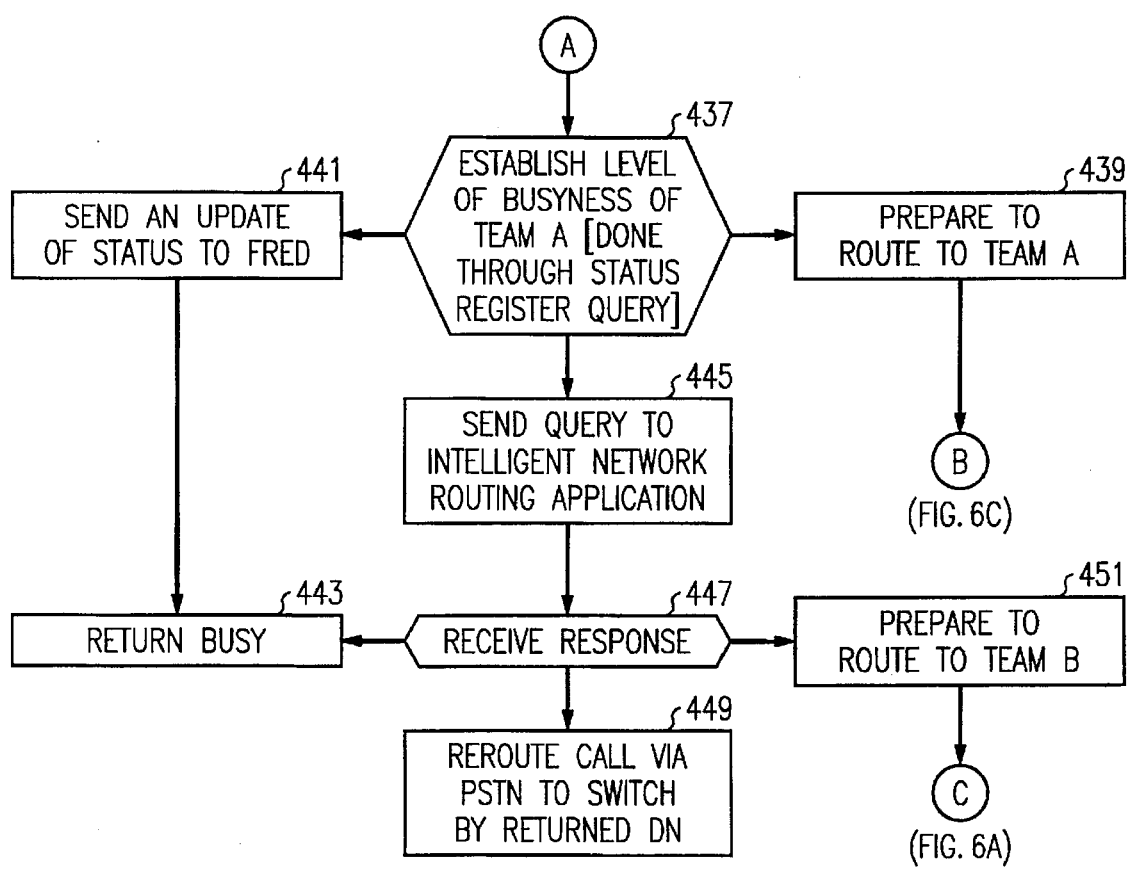
Figure 6C:
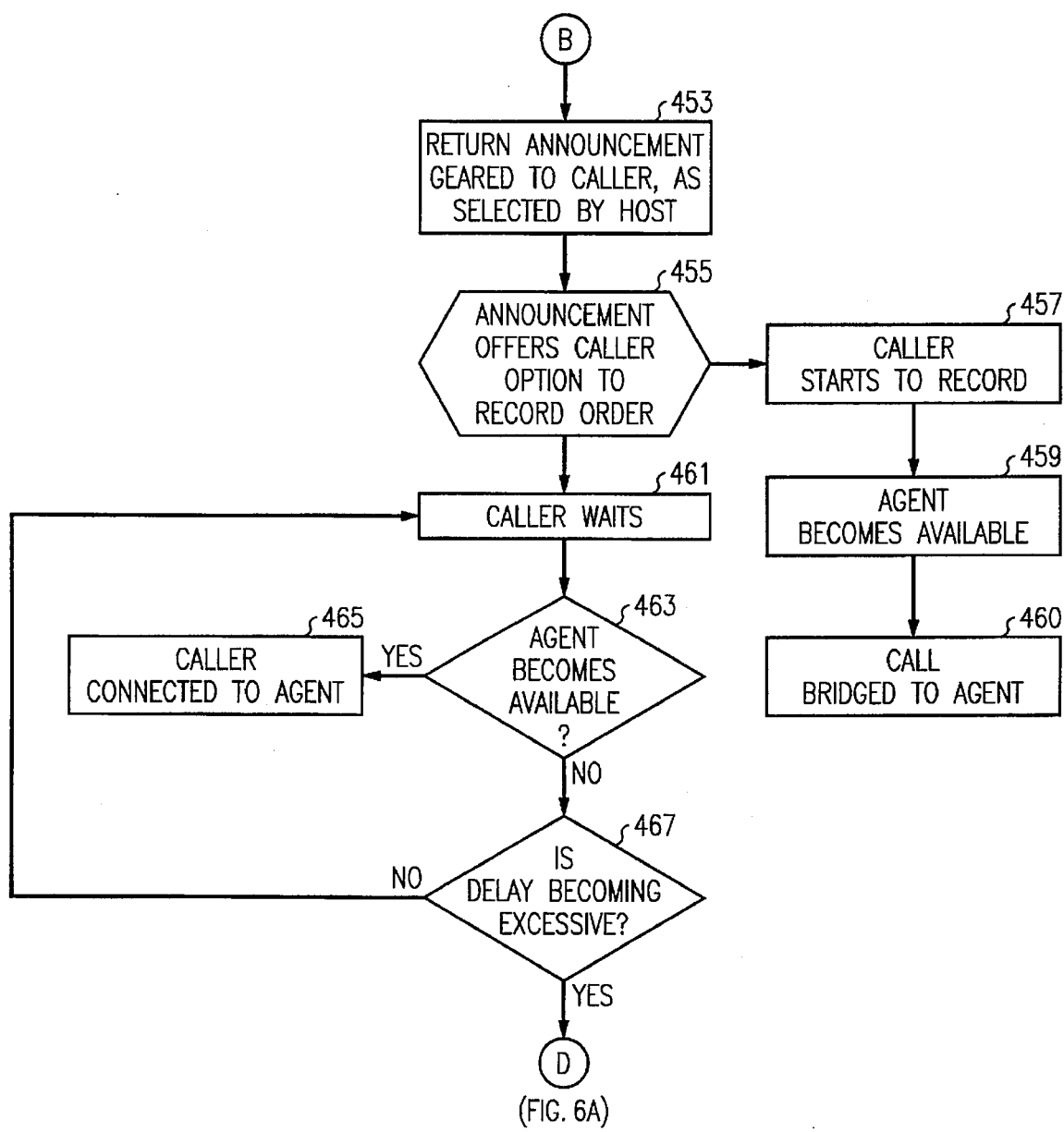

Many of the features of applicants' invention are illustrated in FIGS. 6A, 6B, and 6C. The public switched telephone network receives a call (action block 401, FIG. 6A). The public switched telephone network transmits an initial address message to the service switch which performs the function of an automatic call distributor for at least one customer (action block 403). The service switch translates the directory number (action block 405). If the directory number is not the number of an automatic call distributor with call vectoring (block 407), then the call is given conventional prior art treatment (action block 409). If this is a call with a directory number indicating automatic call distributor service with call vectoring (block 411), then the service switch transmits the called directory number and the caller's directory number (as previously identified using automatic number identification) to a host computer associated with the ACD (action block 413). The host computer translates the called directory number and the received ANI to determine the type of routing desired. The host computer also makes a check of the status of the preferred routing to determine if an alternative is needed because, for example, the preferred treatment leads to sending the call to an overloaded team of agents. Four possible outcomes of the translation of block 415 are specified, namely blocks 417, 423, 431 and 437. These will be considered in sequence.

Block 417 is the beginning of the process of routing a call to a specific individual. For example, if a call is from a special favored client, then the call may be routed directly to the agent or agent's supervisor who handles that client. The call is then forwarded to another directory number which may or may not be served by the service switch (action block 419). The PSDN is notified that the call should be completed to this other directory number. The call is then completed essentially as a POTS (plain old telephone service) call (action block 421).

Block 423 represents the situation in which the call is routed to another queue and hence probably another group of agents because the primary destination is experiencing excessive traffic and the secondary destination is not. Thus, block 423 indicates that the call is to be routed to queue B of the service switch. This is done by sending a response message to the egress switch of the public switched telephone network to ask that switch to route the call to a directory number associated with the alternate team of agents. The call is then routed from the public switched telephone network to the service switch via the alternate directory number assigned to the alternate team (action block 425). The call is then completed as an ACD call (action block 427). This latter action implies queuing the call if no agent is available and attempting to route the call to any available agent.

A third possibility is to route the call to a team of agents in an alternate service center (action block 431). This may be done for one of two reasons: either all the agents in alternate teams of the service switch may be overloaded or otherwise unavailable, or the host may have made a translation indicating, for example, that a call to an order-accepting agent should not be completed because the caller has exceeded his or her credit limits, but that the call should instead be routed to a centralized team of credit agents served by a different switch. The call is rerouted by specifying to the egress public switched telephone network switch that the call should be completed to a different directory number associated with the switch that will serve the call (action block 433). The public switched telephone network then routes the call to the alternate service center (action block 435).

If the output of action block 415 indicates a tentative decision to route to the queue (queue A) specified by the customer's dialed directory number, then action block 437 (FIG. 6B) is entered in order to establish the level of busyness of team A associated with queue A. This level of busyness is established through a status register query.

The status register is updated when there are indications of excessive traffic in the queue for team A. If it is established that the level of busyness of team A is not excessive, then the system prepares to route the call to team A (action block 439) and a transfer is made to the actions indicated in the flow starting with action block 453. If the level of busyness is very high, then an update status is sent to a switching control point which maintains overall routing control for this customer to indicate that calls temporarily cannot be routed to team A (action block 441) and a busy signal is returned to the caller (action block 443).

If the level of busyness of queue A is high, but not high enough to block the calls, a query is sent to the switching control point to determine optimum treatment from an intelligent network routing application (action block 445). Action block 445 is implemented by using the PROBE command with device name FRED and a request for a remote query. (FRED is a data base stored in a switching control point, of the intelligent network for controlling sophisticated routing.) The response is received from the switching control point (action block 447) and if this response indicates that the call should be handled by a local team such as team B, then the serving switch prepares to route the call to team B (action block 451) and transfers to the sequence of steps starting with action block 425. If the response from the switching control point indicates that the call should be rerouted to a specified alternate switch, the alternate switch being specified by a directory number returned from the switching control point, the call is routed by the public switched telephone network according to the returned directory number (action block 449, similar to action block 435). If the response from the switching control point indicates that the customer should simply be given busy tone (or alternatively, an announcement followed by a disconnect), then action block 443 is entered to return busy tone or the announcement and disconnect the call.

If the level of busyness of team A as determined in action block 437 is not so high that the team cannot reasonably handle the call, then the call is routed to team A. If an agent is available, the agent is immediately connected, otherwise, an announcement is returned (action block 453). The announcement may be geared to the caller as selected by the host which, as previously mentioned, has received an identification of the caller through the caller's directory number. For example, the announcement may be customized so that certain customers may receive an announcement advertising hardware and other customers may receive an announcement advertising appliances.

Next, test 455 is used because the announcement offers the caller the option to record his or her order in a voice mail system. If the caller starts to record (action block 457) and subsequently an agent becomes available (action block 459), the call is bridged to the agent (action block 460) who can listen to the order message and simply leave it alone or interact with the customer. If the caller chooses to wait in order to talk to an agent (block 461), subsequently if an agent becomes available (test 463, positive output), the caller is connected to the agent (action block 465). If the agent does not become available, test 467 is used to determine if the delay is becoming excessive. If not, block 461 is reentered and the caller waits some more, possibly while receiving an additional announcement. If the delay is becoming excessive, action block 415 is reentered and the computer retranslates to decide on an alternative routing in view of the excessive delay.

It is to be understood that the above description is only of one preferred embodiment of the invention. Numerous other arrangements may be devised by one skilled in the art without departing from the scope of the invention. The invention is thus limited only as defied in the accompanying claims.

The invention claimed is:

1. In an automatic call distributor (ACD) of a central office switch controlled automatic private branch exchange Centrex a method of establishing a call comprising the steps of:

receiving a call for said ACD when no agents of said ACD is available;

queuing said call;

requesting an indication from a caller of said call whether the caller wishes to be automatically called back;

responsive to an indication that said caller wishes to be called back, marking said call in said queue as a call-back call; and subsequently, when it is the turn of said call to be served, calling back said caller.

2. In an automatic call distributor (ACD) of a central office switch controlled automatic private branch exchange (PBX), said ACD having a local ACD center at least one ACD remote center and for serving customers, a method of establishing a call comprising the steps of:

receiving a call for said ACD when no agent of said ACD is available;

testing whether serving of said call by said local ACD center is expected to be delayed more than a prespecified time;

if said call is expected to be served in less than said prespecified time by said local ACD center, queuing said call in said local ACD center;

otherwise, testing whether said call could be served in less than another prespecified time by one of said remote centers; and serving said call from one of said remote centers if said one remote center is expected to be able to serve that call in less than said another prespecified time;

wherein the testing of said remote ACD centers is performed using an intelligent network data base shared by a plurality of switching systems.

* * * * *